J. P. WASSON, L. A. WOOD AND N. NELSON.
TRACTION CHAIN.
APPLICATION FILED MAY 13, 1919.

1,364,467.

Patented Jan. 4, 1921.
2 SHEETS—SHEET 1.

INVENTORS
JOSEPH P. WASSON
LIN A. WOOD
NATE NELSON
BY
Strong Townsend
ATTORNEYS

J. P. WASSON, L. A. WOOD AND N. NELSON.
TRACTION CHAIN.
APPLICATION FILED MAY 13, 1919.

1,364,467.

Patented Jan. 4, 1921.
2 SHEETS—SHEET 2.

INVENTORS
JOSEPH P. WASSON
LIN A. WOOD
BY NATE NELSON

Strong & Townsend
ATTORNEYS

UNITED STATES PATENT OFFICE.

JOSEPH P. WASSON, LIN A. WOOD, AND NATE NELSON, OF KING CITY, CALIFORNIA.

TRACTION-CHAIN.

1,364,467.  Specification of Letters Patent.  Patented Jan. 4, 1921.

Application filed May 13, 1919. Serial No. 296,843.

*To all whom it may concern:*

Be it known that we, JOSEPH P. WASSON, LIN A. WOOD, and NATE NELSON, all citizens of the United States, residing at King City, in the county of Monterey and State of California, have invented new and useful Improvements in Traction-Chains, of which the following is a specification.

This invention relates to a traction chain and particularly to a detachable chain for use on trucks, tractors and the like.

One of the objects of the present invention is to provide a simple, substantial and easily applied traction chain especially adapted for use in connection with solid rubber tires such as are employed on auto trucks and other heavy self-propelled vehicles and in conjunction therewith to provide tread plates or grousers, whereby the traction of the wheels may be materially increased.

Another object of the invention is to provide a chain of novel construction, consisting of a series of interspaced rigid links connected by means of chain links. Furthermore, to provide a grouser or tread plate of novel construction and a pivotal mounting for the same, which permits rocking movement of the tread plates with relation to the ground surface and the tire when in operation.

Further objects will hereinafter appear.

The invention consists of the parts and the construction, combination and arrangement of parts as hereinafter more fully described and claimed, having reference to the accompanying drawings, in which—

Figure 4:
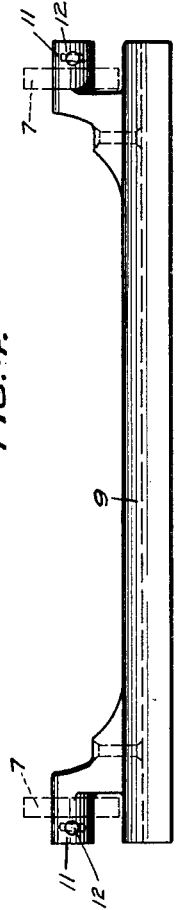
Fig. 4 is an enlarged cross section of a chain, showing the mounting of the tread plate.

Referring to the drawings in detail, A indicates a standard form of wheel, such as employed on auto trucks and other self-propelled heavy road vehicles; 2 indicates the hub; 3, the spokes; 4, the felly; 5, the clencher rim; and 6, the solid rubber tire. Arranged on each side of the tire is a chain which consists of a series of rigid links 7 which are connected by ordinary chain links, such as shown at 8. Pivotally mounted on each pair of rigid links, as shown in Fig. 4, is a grouser plate 9. These plates are semi-circular in cross section and are provided with lugs 10 and pins 11 which serve as a pivotal mounting for the grouser plates, the pins 11 being sufficiently long to project through perforations formed centrally of each rigid link section 7.

The chain, when assembled, consists of rigid links 7 arranged in pairs, said links being connected by the chain link sections 8 and by the grouser plates 9, said grouser plates being pivotally mounted between the rigid link sections and being locked against removal with relation to said links by means of cotter pins 12 passed through perforations formed in the outer ends of the pins 11.

Figure 3:
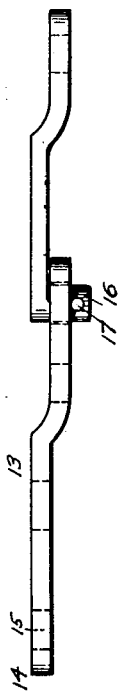
Fig. 3 is a detailed view of the connecting links.

The traction chain therefore consists of two chain sections, one disposed on each side of the clencher rim 5 of the tire 6, said chain section being connected by the grouser plates. For the purpose of readily removing or applying the traction chain, I provide a pair of end links of novel construction. One of said links, as shown at 13, is similar to the rigid link section 7 but it is extended as at 14 and provided with two or more perforations, as at 15. The opposite or coöperating links, shown in Fig. 3, are also similar to the rigid link section 7 but their outer ends are turned at right angles and pin-shaped as at 16, to permit a connection to be formed by inserting the pins through the perforated ends 14 of the links 13, and then securing the same against removal by insertion of cotter pins through perforations 17. The chain, when thus applied, is free to move circumferentially with relation to the tire as no other securing means are provided. This is of considerable importance as it permits a slight slippage to take place between the grousers, the chains and the solid tire and thereby prevents uneven wear on the tire.

Figure 1:
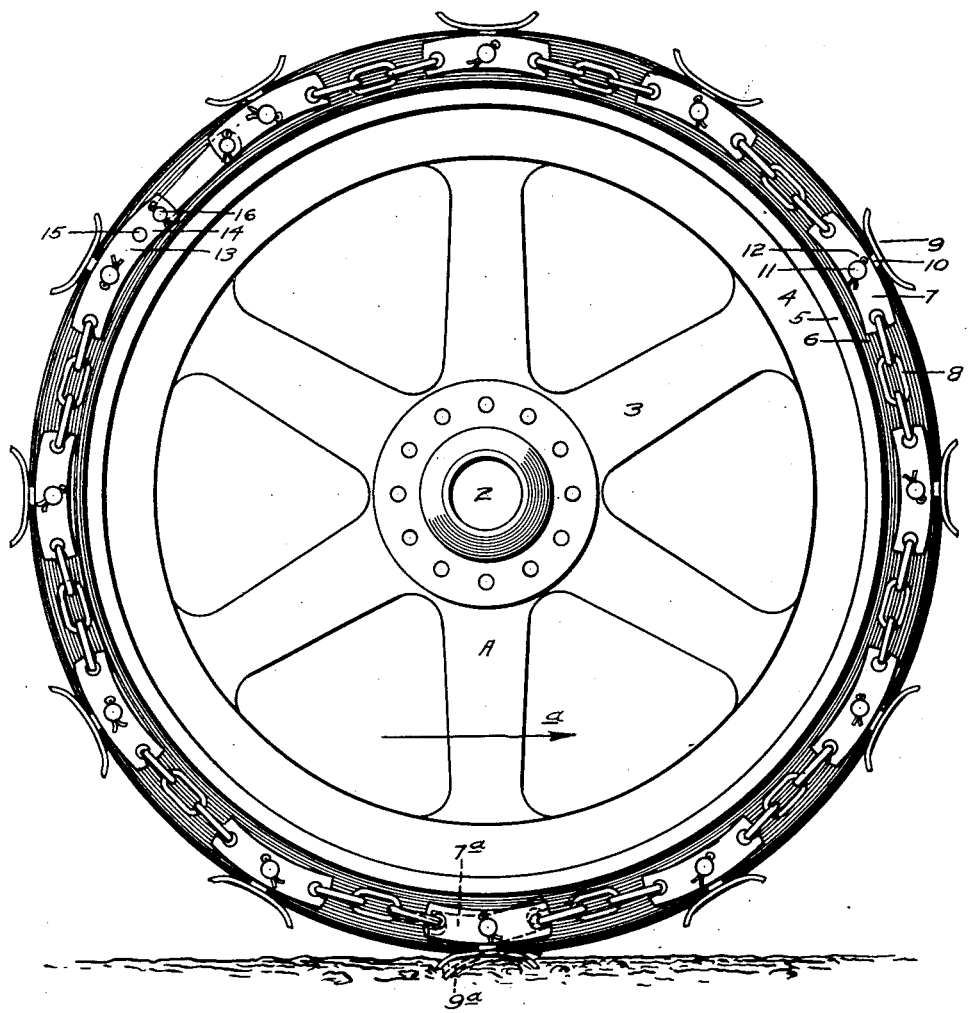
Figure 1 is a side elevation of a wheel, showing the application of the invention.
Figure 2:
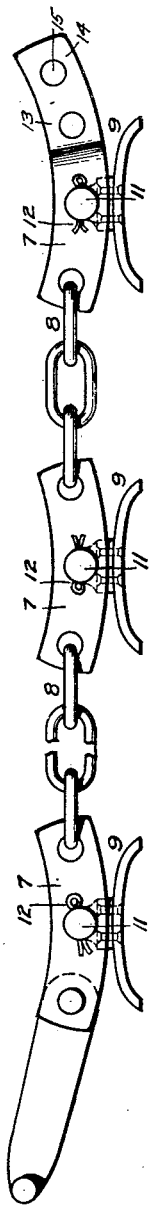
Fig. 2 is a side elevation of a portion of the chain.

In actual operation we find that the chain is self-tightening. This is due to the fact that the grouser plates are pivotally mounted between the rigid link sections 7; for instance, by referring to Fig. 1, it will be seen that as the wheel travels in the direction of arrow *a*, traction between the outer surface of the tire and the grouser plates, has a tendency to tilt the same into the inclined position shown at 9ª. The forward end of the grouser plate will thus strike the forward ends of the rigid link sections 7 and cause these to assume a tilted position, as indicated at 7ª. A lever or tightening action is thus obtained which rigidly secures the chain and grousers to the wheel when in operation. In other words, a bite is formed between the grousers and the tire which positively prevents slippage.

From the foregoing description, it can readily be seen that a simple and efficient chain attachment has been provided, which, when applied to solid tires of the character here shown, will materially increase the tractive efficiency of the same; similarly, that the tire is protected against bruises and wear as it is more or less supported by the grousers and protected. It might be stated that the grousers form an armor for the tire, thereby taking up the major wear and to that extent reducing tire wear.

An important feature of the present invention is the curved shape of the rigid link sections 7. Another important feature is the curved cross-sectional shape of the grousers 9. By referring to Fig. 1, it will be seen that the links and the grousers supported thereby are curved in opposite directions. This is exceedingly important as it permits a free rocking movement which is not liable to be interferred with if sticks or other obstructing material should become interposed between the grousers and the links. A shearing action would merely be obtained as the rigid links are disposed at the end of the grousers. They are otherwise free as they engage no other portion of the chain, being entirely supported by the ground surface and engaged by the tread portion or solid tire 6.

While a single tired wheel is here shown, we wish it understood that the present chain attachment may be readily applied to double tread tires and the like by merely increasing the width of the grousers; we similarly wish it understood that the materials and finish of the several parts comprising the chain may be such as the experience and judgment of the manufacturer may dictate.

We claim:

1. The combination of a tread plate with a traction wheel having a solid tire, said plate having an exterior convex surface and being approximately equal in length to the width of the tire, and means for journaling the ends of said plate, whereby a pivotal rocking movement of the same will be permitted with relation to the periphery of the tire.

2. The combination of a tread plate with a traction wheel having a solid tire, said plate being approximately equal in length to the width of the tire and having a concave top surface and a convex under surface, both of which surfaces extend the entire length of said plate, and means for journaling the ends of said plate, whereby it will be permitted to rock upon the periphery of the tire.

3. The combination of a tread plate with a traction wheel having a solid tire, said plate being approximately equal in length to the width of the tire and having a concave top surface and a convex under surface, both of which surfaces extend the entire length of the plate, and means for journaling the ends of said plate, whereby the plate will be permitted to freely rock upon the periphery of the tire, said journaling means being independent of the traction wheel.

4. The combination of a plurality of tread plates with a traction wheel having a solid tire, said plates being circumferentially arranged in spaced relation on said tire, each plate being substantially equal in length to the width of the tire and having a concave top surface and a convex under surface, a trunnion secured to the end of each plate, a plate journaled upon each trunnion, said plates being disposed concentrically with respect to the tire and flexible connecting means between the adjacent ends of said plates whereby the tread plates are held in relatively spaced relation.

In testimony whereof we have hereunto set our hands in the presence of two subscribing witnesses.

JOSEPH P. WASSON.
LIN A. WOOD.
NATE NELSON.

Witnesses:
B. F. HEAMES,
WM. WASSON.